(12) United States Patent
Harris (10) Patent No.: US 8,670,647 B2
(45) Date of Patent: Mar. 11, 2014

(54) LOCKING OF PROGRAMS AGAINST FAST FORWARDING

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 287 days.

(21) Appl. No.: 12/825,083

(22) Filed: Jun. 28, 2010

(65) Prior Publication Data

US 2011/0317977 A1    Dec. 29, 2011

(51) Int. Cl.
| | |
|---|---|
| H04N 9/80 | (2006.01) |
| H04N 5/935 | (2006.01) |
| H04N 5/931 | (2006.01) |
| H04N 5/783 | (2006.01) |
| H04N 7/10 | (2006.01) |
| H04N 7/025 | (2006.01) |
| H04N 5/445 | (2006.01) |
| G06F 3/00 | (2006.01) |
| G06F 13/00 | (2006.01) |

(52) U.S. Cl.
USPC ........... 386/239; 386/240; 386/249; 386/250; 386/251; 386/205; 386/206; 386/343; 725/32; 725/34; 725/35; 725/36; 725/42

(58) Field of Classification Search
USPC ......... 386/239, 240, 249, 250, 251, 205, 206, 386/343; 725/32, 34, 35, 36, 42
See application file for complete search history.

(56) References Cited

U.S. PATENT DOCUMENTS

| | | | | |
|---|---|---|---|---|
| 7,805,052 | B2 * | 9/2010 | Nakamura et al. | 386/326 |
| 7,849,487 | B1 * | 12/2010 | Vosseller | 725/88 |
| 2003/0154128 | A1 * | 8/2003 | Liga et al. | 705/14 |
| 2004/0104926 | A1 * | 6/2004 | Murray et al. | 345/719 |
| 2008/0104632 | A1 * | 5/2008 | Kwon | 725/32 |
| 2008/0183624 | A1 * | 7/2008 | Grigorovitch et al. | 705/51 |
| 2008/0304809 | A1 * | 12/2008 | Haberman | 386/68 |
| 2010/0162301 | A1 * | 6/2010 | Minnick | 725/34 |

* cited by examiner

*Primary Examiner* — Daquan Zhao
(74) *Attorney, Agent, or Firm* — Law Office of Scott C. Harris, Inc.

(57) ABSTRACT

Speed of commercial playing is detected and used for determining whether program information can be played.

23 Claims, 5 Drawing Sheets

LOCKING OF PROGRAMS AGAINST FAST FORWARDING

BACKGROUND

A digital video recorder function can record video to be played back later. For example, a user can digitally record a program that occurs at one time, call it eight o'clock, and watch that program at another time say nine o'clock. This "timeshifting" function can allow users to watch programs when they want, rather than when they are played live.

There are many commercially successful digital video recorders, including those made by TiVo, and others. Also, certain content providers, such as cable providers, also often provide network recording functionality either as a standalone device, or as a network function. It is envisioned that some televisions will provide the capability of doing the same thing.

Many of these devices allow a user to rewind to review a certain scene or portion, or to fast-forward over an undesired scene or portion. This has given rise to users fast forwarding over "commercials".

SUMMARY

Program providers often rely on the income from a user watching commercials. However, if users fast forward over the commercials, that income stream may be compromised.

According to the present system, codes are placed on the commercial portions, and those codes are used to watch the non-commercial portions. The codes are put on the commercial portions in a way such that the codes will not be properly received if the user fast-forwards over the commercial.

In the embodiments, the codes may be decryption codes, or may be unlock codes.

According to an embodiment, a section of program is prevented from being played completely without the code obtained from the immediately preceding section of commercials.

In one embodiment, the program may be prevented from being played without the code.

In another embodiment, the program is played in a reduced-desirability fashion such as with reduced resolution or with intentionally added interference.

BRIEF DESCRIPTION OF THE DRAWINGS

In the drawings.

the present system . . .

DETAILED DESCRIPTION

Figure 1:
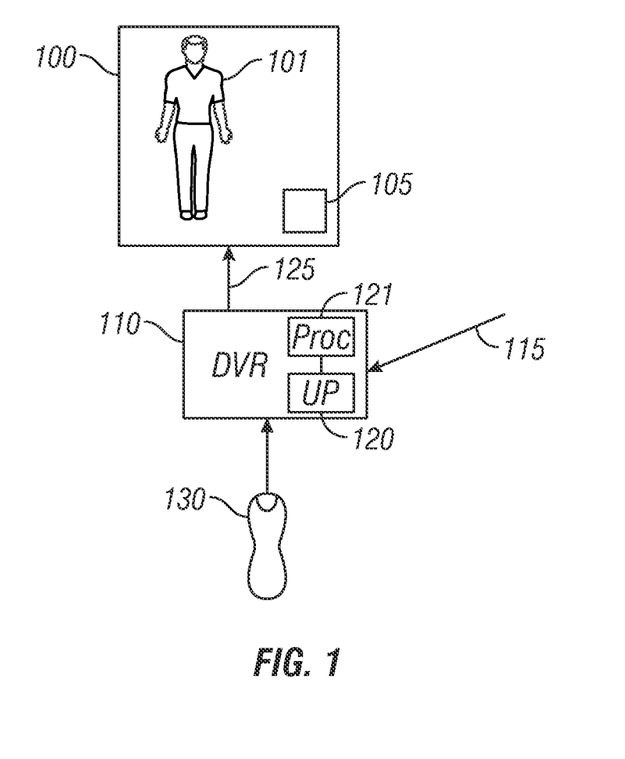
FIG. 1 shows a block diagram of an entertainment system according to an embodiment . . .

FIG. 1 shows an entertainment system, including a video display 100, for example a television, and a digital video recorder module 110. There is a connection between the digital video recorder 110 and the video display 100. The video display 100 can display an image or video such as 101 based on information 125 from the digital video recorder 110. The digital video recorder also itself receive program information over a channel such as 115 which can be for example a cable channel or broadcast channel or any other kind of channel of information. The received information may be analog or digital.

Information is converted to digital and stored on a storage device 120 within the digital video recorder. The storage device 120 may be, for example, a hard drive or solid state drive (SSD). An operating processor 121 receives commands for example from a remote control 130, plays back information from the storage device 120 and provides it over the information link 125. The processor 121 may be, for example, any kind of processor such as a digital signal processor, or reconfigurable logic, or a general processor that executes instructions.

While this embodiment calls the device a digital video recorder and shows it as stand-alone separated from the television 100, it should be understood that the digital video recorder module can be built into the television, or can be part of any device which allows storing information indicative of a received broadcast (audio and/or video) and allows playing it back later. The digital video recorder can also be embodied by a general purpose computer.

The processor 121 runs an operating program that allows certain functions. The operations may include information that allows the digital video recorder to "rewind", "fast-forward" and skip in various ways. For example this may allow skipping forward by 30 seconds, 15 minutes, or by any other amount.

In a first embodiment, the information 115 is received in a special coded way. The coding as described herein is referred to as being encrypted, however more generally any coding that prevents the program from being played by the television 100 without some kind of special key, can be used according to this system. In this embodiment, the special key is used to decode some portion of the video program.

According to another embodiment, the information 115 is received uncoded, but the DVR 110 adds coding of the type described in the embodiments, at the time of recording.

Figure 2:
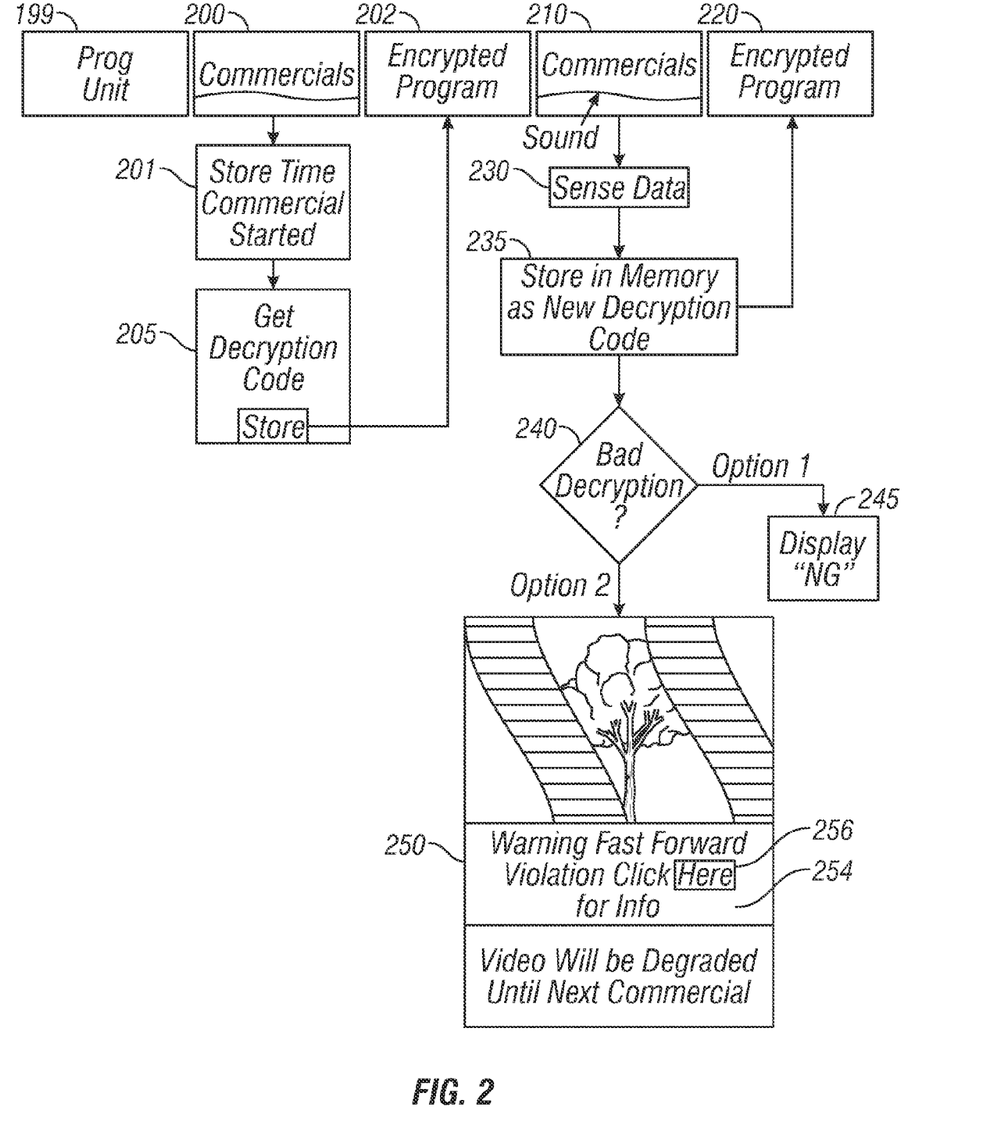
FIG. 2 shows another embodiment where features can be carried out by the processor and the DVR.

FIG. 2 shows an embodiment, where one or more features of this embodiment may be carried out by the processor 121 in the DVR and/or a processor 105 in the TV.

A video stream is received as temporally accurate information, including information to be played at a current time. For example, 30 minutes of real time play information may be received over a course of 30 minutes. FIG. 2 shows how the program portion may include a number of different program portions such as 199, 202, 220. These may be received at certain times, for example 10 minutes of programming may be represented by the program portion 202. After the first time of program portion 199, there is a commercial portion 200. The commercial portion is ongoing for a certain amount of time, after which time there is another program portion 202, this portion being encrypted. After program portion 202, there is a group of commercials 210, then another encrypted program portion 220.

More generally, each program segment (except possibly the first segment 199) may have a preceding commercial segment. An initial program segment 199 may have no commercial preceding it, this may be the initial part of the program, for example the introductory few minutes of the program which includes some introduction to the plot of the program and perhaps the program's logo, theme and credits.

In this embodiment, the programs are coded, and more specifically encrypted. The encryption prevents the program from being played without the decryption key. The program portion 202, for example, will not be playable without the decryption key for that portion. FIG. 2 shows how the system operates, with the playing of commercials at 200, first storing a start time of the commercials, then storing a decryption code from the commercial at 205. That decryption code at 205 is used to play the encrypted program 202.

Different formats of encrypting television programs are known. For analog analog television programs, the operation can invert the sync, or encode and/or hide the audio. Since the programs here may be digital, any digital form of encryption may be used.

According to an embodiment, the commercials 210 include decryption data 211 therein, encoded in a way such that the decryption data is not properly received if the user fast forwards over the commercial. In this embodiment, the data been may be recorded in a sub band of the audible sound of the commercial. For example, the audible sound may have, included therein, a coded decryption key.

Part of the operating program of the processor 121 continually receives information such as sound. The sound includes this data, and at 230, the program senses the data in this sound portion.

That data is then stored at 235 as a current decryption code. The current decryption code may be stored as 235 in the hard drive 110. The most recent decryption code is used to decrypt the program segment 220.

In a similar way, the encrypted program 202, 204 is decrypted using the decryption code 205 received from prior commercials. However, the program 199 may be uncoded and require no decryption at all.

In one embodiment, when the decryption code is not proper for an encrypted program, then nothing at all is played.

240 illustrates options for the decryption code. Embodiment 1 may create a mask, referred to in the flowchart 245 as "NG" which simply says the video is "no good", due to copyright violation, or terms of use violation, or some such operation. A second option shown as 250 may display a partial version of the program. The partial version may be a low resolution version, or may be as shown, a version with intentional interference 252 therein. The intentional interference, for example, may be areas on the video that are intentionally blanked or otherwise obscured. In the embodiment 250, the video is displayed with the words "warning-fast-forward violation, video will be degraded until next commercial is played".

There may also be an information screen part 254 which includes a hyperlink 256 that provides information about the fast-forward violation. The hyperlink can be selected with the remote control to cause an information screen to be displayed by information in the DVR.

Figure 3:
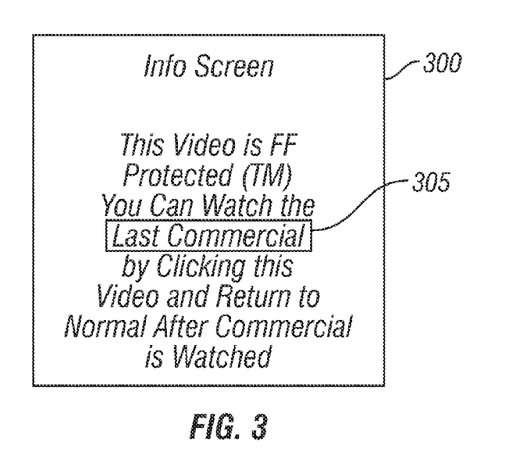
FIG. 3 shows information about the video.

The information displayed responsive to the hyperlink may be information such as shown in FIG. 3 which indicates that the video is "fast-forward protected". The screen indicates that "you can watch the last commercial by clicking this link." As described above, this DVR stores a time stamp at 201 of the beginning of the last commercial. The info screen 300 may have a link on the word last commercial, where that link automatically changes the time stamp to the time of start of the last commercial. As the commercial is watched, the decryption code for that commercial is obtained, which allows normal watching of the information. The video returns to normal after the commercial is watched, since after the commercial is watched, the most recent decryption code is proper to decode the program.

Figure 4:
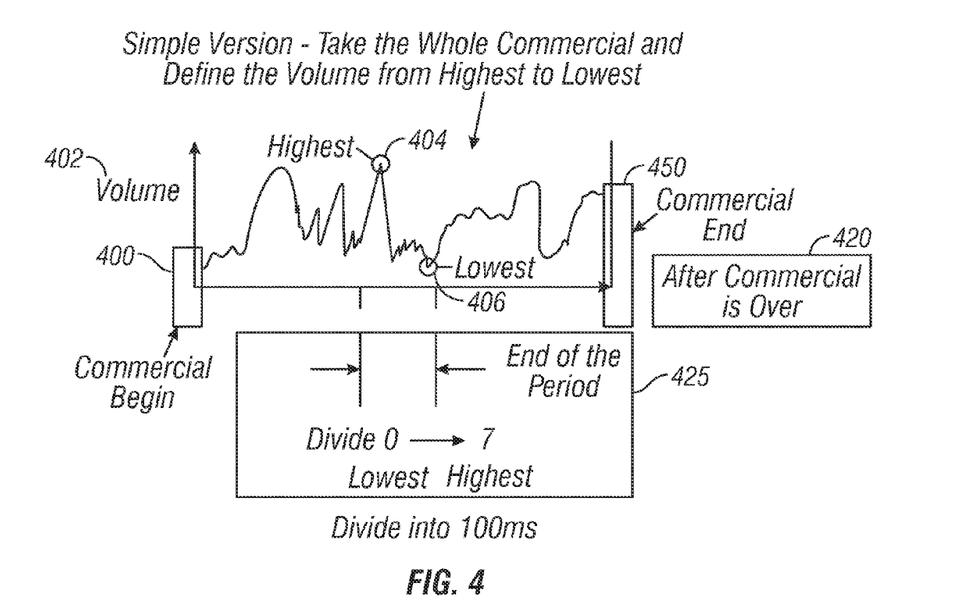
FIG. 4 shows a graph of the volume.

As described above, the decoding code, here a decryption code, is formed from the sound within the video and can only be made when the sound is played at normal speed. FIG. 4 shows one way in which the code can be formed from the playing at normal speed.

The volume is graphed in FIG. 4, from a beginning portion 400 of the commercial to an ending portion 450 of the commercial. The beginning and end can be, for example, marked within the video program by a special segment in one embodiment that indicates commercial beginning and commercial ends. In this embodiment, the marked commercial beginning can be used as the location of the "last commercial" link.

Video producers have conventionally resisted marking the commercials, out of a concern that marking the commercials would facilitate users to avoid those commercials. However, in this embodiment, failure to watch the commercials is prevented. This allows the commercial beginning and end to be marked.

In the embodiment, the commercial can be recorded on a separate recording kernel during the time that the commercial is being played back. The recording can be in a separate buffer. The volume of the commercial is shown on the x axis 402. After the entire commercial has been played back, the highest volume point 404 is identified, and the lowest volume point 406 is identified. This can be done after the commercial is over shown as 420. This determination should only take a few milliseconds for the processor, and so a brief pause after the commercial is over may be experienced.

At 425, this establishes that time period as the period of the decryption, which extends from the highest volume portion of the commercial to the lowest portion of the commercial.

Another embodiment forms the time periods across the whole commercial as established by at least one of beginning and end points. Another may look for markings that have been put within the commercials. Other waters of finding the commercials are also contemplated.

This period of decryption is divided into segments, for example 100 ms segments. In the embodiment, each segment becomes a bit, with the first bit being the highest bit and the end bit being the lowest bit. This may provide very low security decryption, however high security encryption may not be necessary because of certain laws that prevent circumventing copyright maneuvers in this way.

An alternative embodiment may encode the encryption into some other sub band that must be played at normal speed to be received. This may include brightness of the commercial using similar techniques to that of FIG. 4 using a maximum to minimum brightness system. It may also use a system where the decryption starts the first time that the brightness or sound exceeds a level N. For the brightness operation, it can use brightness of all pixels or only the brightnesses of certain pixels.

These systems may be used to retrofit an existing system, by using an external box, for example or by inserting using a software module.

Figure 5:
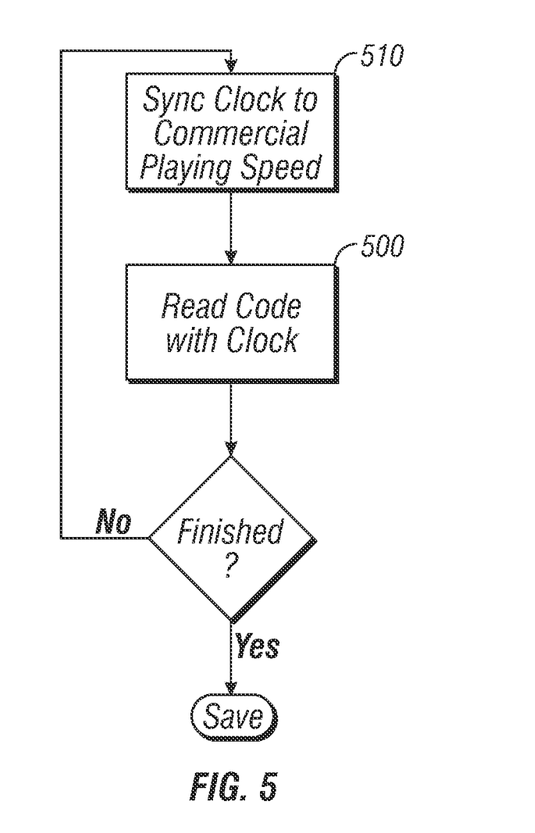
FIG. 5 shows an embodiment where a digital code is read from the commercial.

Any other decryption system may be used, where the video is encoded in a way that requires a code in order to play the video normally, where that code is placed within the commercial in some way that it can only be received when the commercial is played at normal speed, but is not properly received when the commercial is played at fast-forward. For example, this may include digital bits or analog information in a band that has sufficient density that fast forwarding will cause the reader to miss some of the information and hence to create an improper code or no code at all. FIG. 5 shows this embodiment, where a digital code is read from the commercial at 500. This code is read "correctly" only if the commercial is played at normal speed. For example, this can use logic whereby the ones and zeros are only established as being correct when they are received for a length of time that corresponds to the commercial being played at normal speed.

Another embodiment may sync the reading clock periodically to the speed of playing of the commercial at 510. The proper decryption clock, and hence proper decryption code is obtained only when the commercial is played at normal speed. Another embodiment may use an image that must be seen for a specified amount of time to form the code.

The information may also include, as conventional, error correcting codes, so that certain errors can be corrected. The error correction, however, cannot be sufficient be robust to correct errors that occur due to fast forwarding.

The above embodiments form the code itself from the commercial. Alternative embodiments use a time of receipt technique to form an unlock code, rather than a decryption code as formed in the FIG. 1 embodiment. FIG. 4 shows one such embodiment. All of the techniques described herein can be used with both the FIG. 1 and FIG. 4 techniques.

Figure 6:
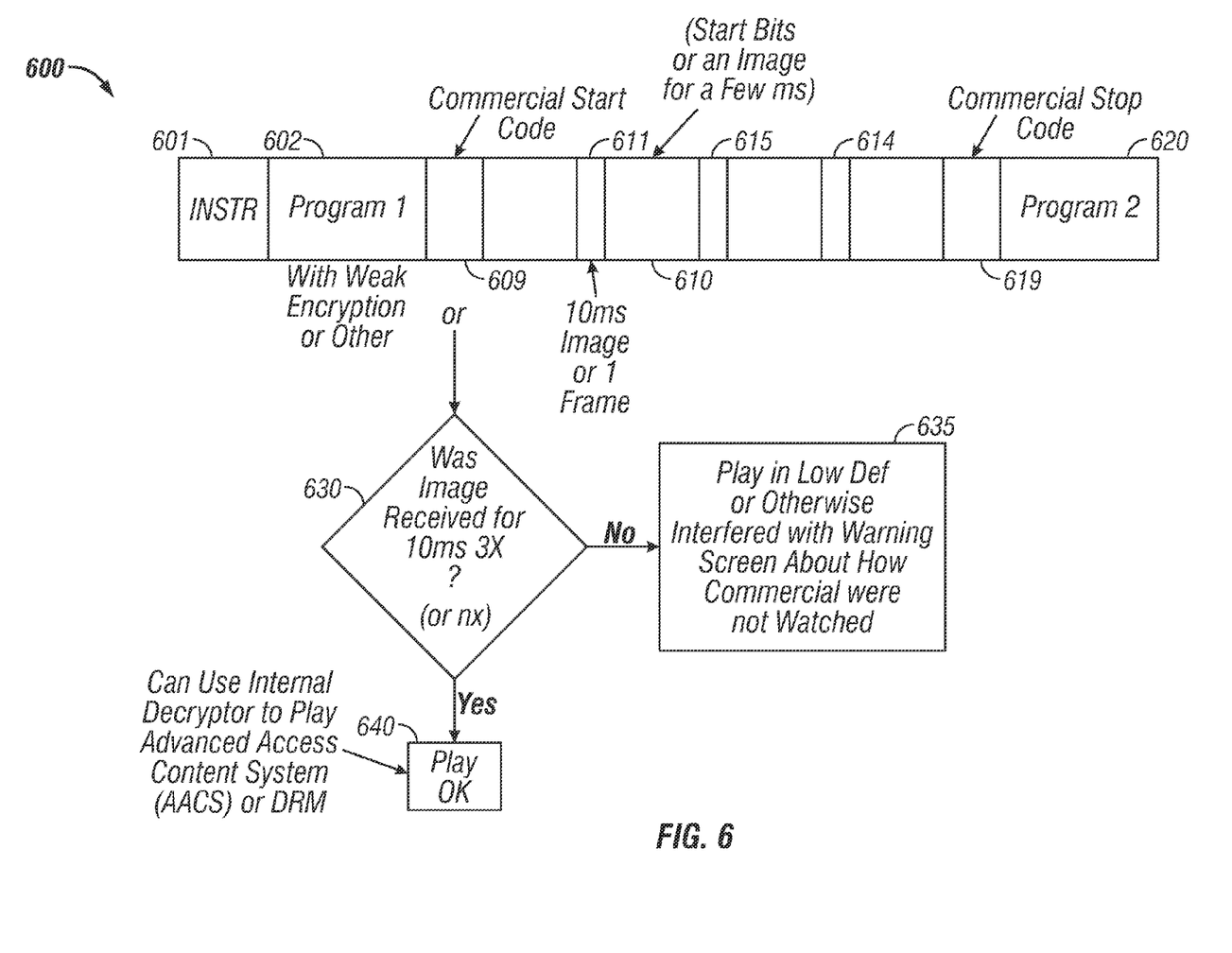
FIG. 6 shows a depiction of the stream of information that represents the program.

FIG. 6 shows a stream of information 600 which represents a program. That stream of information includes the program segment 602, a commercial segment 610, and then a second commercial segment 620. The commercial segment 610 is preceded by a start code 609, and ends with a stop code 619. The commercials start code may be start bits of a conventional type, or alternatively may be a digital code or image based code. For example, the image based code may be an image that occurs for a few milliseconds within the commercial, preferably for a time below the persistence of vision, to avoid being seen or perceived by a user. The image may also occur on a sub band of a type that is not actually viewed by a user.

The code, or image, may be shown intermittently produced for throughout the commercial. For example, the code may be shown at 611 during the commercial, 613, and 616. Commercial content such as 612 is interspersed between these image codes. In this embodiment the image may only be received for 10 ms, however the image can be received for any desired amount of time, such as 100 ms. While playing the commercial, the processor operates to watch for the specific images. The "instruction" portion 601 may indicate information about the image to watch for. For example, each frame may be quick-correlated against the image in the instruction portion by the processor 121 in the DVR or by some other processor.

As an alternative, the image codes may be sent to the processor over the network, or may be pre-stored in the processor via a network operation at specified times.

The processor 121 carries out a flowchart which begins at 630 to determine whether the image was received for the specified amount of time (here 10 ms), and a specified number of times (here three times). For example, the video may require that the image within the video be received three times during each commercial segment for the specified amount of time (10 ms) each time. If the user is fast forwarding the commercial, then the image will not be received for the specified amount of time, for example a 10 ms image on the 2×-fast-forward will only be received for 5 ms. Therefore 630 determines whether most of the commercial is played and whether it was played at normal speed.

If not, flow passes to 635 which plays the "defeated" version of the video, here in low definition or otherwise changed as described herein, e.g., with a warning screen about how the commercials were not watched. If the image was properly received at 640, then the playing is ok. This may set a bit in the internal system that allows the playing to continue, and can use an internal decrypter to play the video using an internal decryption key. For example, this can use an existing video encryption system such as the advanced access content system (AACS), or can use digital rights management (DRM).

According to an embodiment, the beginning part of the program 602 may be in plain text or otherwise marked as "always playable" since no commercials have yet been shown. The beginning part of the program may also include an instruction segment 601. The instruction segment 601 includes instructions for how many times the images must be seen, and includes the images themselves.

Image crosscorrelation between the set image and the received image may be used on each image to determine that the image has been properly received, and once properly received, the time that the images received can also be measured.

There are many advantages of this system. One could imagine that a program of provider could completely locked a DVR against fast forwarding using electronic means, or using some form of agreement. However, this would prevent the user not only from fast forwarding over the commercials. However, this would also lock the user against fast forwarding over portions of the video that they did not want to see. For example, if the user wanted to watch the last half of the program over again, they would not be able to fast-forward to that last half. This system allows fast forwarding, but prevents content from being watched normally unless the commercials are actually watched. In this way, a user could fast forward to a location in the program where they wanted to watch, press play, and either rewind back to the last commercial set, or click the link to go back to the last commercial set. This is not available from any other system.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other encryption techniques can be used. Other techniques of determining whether the commercial was played at normal speed can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be used for the electronics, and that may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system comprising:
a storage part that stores video that has been produced at a first time;
a playing part, that plays said stored video, said playing part including a commercial speed detecting part that detects whether commercials within the stored video were played at normal speed, and produces an indication that the commercials were played at normal speed, and plays portions other than said commercials normally only when said indication has been produced that the commercials were played at normal speed, wherein said playing part automatically displays a screen responsive to detecting that a first of the commercials were played at faster than normal speed, and wherein said screen includes a link that can be selected to automatically change a position of viewing to a beginning of the first commercial that was played at faster than normal speed;
wherein said storage part stores at least one part of video as encrypted information that can only be decrypted when said at least one commercial has been played at said normal speed and where reading at faster than normal speed will cause the playing part to fail to read information from a decryption code, thereby producing an improper decryption code.

2. A system as in claim 1, wherein said video stored in said storage part includes plural different program parts, and plural different commercial parts, with a first commercial part preceding a first program part, and with a second commercial part preceding a second program part, and wherein said first program part is played normally only when said first commercial part was played at normal speed, and where said second program part is not played normally based on said first commercial part being played at said normal speed, but is played normally based on said second commercial part being played at said normal speed.

3. A system as in claim 2, further comprising an initial program segment preceding said first commercial part, which can be played normally without said indication.

4. A system as in claim 1, wherein said indication is a decryption code that is used to decrypt said portions other than the commercials.

5. A system as in claim 4, wherein said commercial speed detecting part reads content of the commercials and extracts the decryption code from said content.

6. A system as in claim 1, wherein said indication is an indication that portions other than the commercials can be played normally.

7. A system as in claim 1, further comprising an initial program segment, which can be played normally without said indication.

8. A system as in claim 1, wherein said playing part reads marks that indicates a beginning of a commercial within said video stored in said storage part.

9. A system as in claim 1, wherein said commercial speed detecting part detects whether a specified part was received for a specified amount of time, wherein said specified amount of time is an amount of time it will take to play said specified part at normal speed.

10. A system as in claim 9, wherein said specified part is a specified image within the commercial.

11. A system as in claim 1, wherein said link is a selectable hyperlink that when selected automatically moves the position of viewing to the beginning of the commercial that was played at faster than normal speed.

12. A system as in claim 1, further comprising a recording part, that records video at said first time, and stores said video in said storage part.

13. A system as in claim 12, further comprising controls for said playing, said controls allowing fast forwarding.

14. A system as in claim 1, wherein said storage part is a hard drive.

15. A method comprising:
   storing video in a memory device under control of a programmed processor; using said processor for controlling playing of said video; using said processor for detecting a speed of playing commercial;
   based on said detecting, using said processor for determining if a first set of commercials were played at normal speed, and produces an indication indicative thereof; and
   using said processor for playing a first program portion that is temporally associated with said first set of commercials normally when said first set of commercials were played at said normal speed, and not playing said first program portion normally when said first set of commercials were played at faster than normal speed, wherein said playing part automatically displays a screen responsive to detecting that a first of the commercials was played at faster than normal speed, and wherein said screen includes a link that can be selected to automatically change a position of viewing to a position of a beginning of the first commercial that was played at faster than normal speed;
   wherein at least one program portion as encrypted information that can only be decrypted when said at least one commercial has been played at said normal speed and where reading at faster than normal speed will cause the processor to fail to read information from a decryption code, thereby producing an improper decryption code.

16. A method as in claim 15, wherein said video stored by said storing includes plural different program parts, and plural different commercial parts, with a first commercial part preceding a first program part, and with a second commercial part preceding a second program part, and wherein said first program part is played normally only when said first commercial part was played at normal speed, and where said second program part is not played normally based on said first commercial part being played at said normal speed, but is played normally based on said second commercial part being played at said normal speed.

17. A method as in claim 15, further comprising an initial program segment, which can be played normally without said indication.

18. A method as in claim 15, wherein said detecting a speed detects whether a specified part was received for a specified amount of time, wherein said specified amount of time is an amount of time it will take to play said specified part at normal speed.

19. A method as in claim 15, wherein said link is a selectable hyperlink that when selected automatically moves the position of viewing to the beginning of the commercial that was played at faster than normal speed.

20. A system comprising:
   a receiver, that receives information including video information over a channel;
   a storage part, that stores said video information that has been received over the channel, said storage part storing video program information and commercial information, where said commercial information is stored with information that allows determining if the commercials are played at normal speed; and
   a playback part, that allows playing at least one part of said program information at said normal speed only when detecting that at least one commercial was played at normal speed, wherein said playing part automatically displays a screen responsive to detecting that a first of the commercials was played at faster than normal speed, and wherein said screen includes a link that can be selected to automatically change a position of viewing to a position of a beginning of the first commercial that was played at faster than normal speed.
   wherein said storage parts stores said at least one part as encrypted information that can only be decrypted when said at least one commercial has been played at said normal speed and where reading at faster than normal speed will cause the playback part to fail to read information from a decryption code, thereby producing an improper decryption code.

21. A system as in claim 20, wherein said commercial stores a decryption code for said at least one part.

22. A system as in claim 21, wherein said decryption code can only be read correctly from said commercial at normal speed and where reading at faster than normal speed will cause the playback part to fail to read information from the decryption code, thereby producing an improper decryption code.

23. A system, comprising:
   a storage part that stores video that has been received at a first time;
   a playing part, that plays said stored video at a second time subsequent to the first time, said playing part playing program portions that are other than commercials normally only when commercials were played at normal speed , wherein said playing part receives a decryption code for said program portions while reading the commercials, and wherein said decryption code can only be read correctly from said commercial at normal speed and where reading at faster than normal speed will cause the playback part to fail to read information from the decryption code, thereby producing an improper decryption code.

* * * * *